(12) United States Patent
Kawahata (10) Patent No.: US 10,834,276 B2
(45) Date of Patent: Nov. 10, 2020

(54) SYSTEM, MANAGEMENT SERVER SYSTEM AND CONTROL METHOD

(71) Applicant: CANON KABUSHIKI KAISHA, Tokyo (JP)

(72) Inventor: Ryo Kawahata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/443,275

(22) Filed: Jun. 17, 2019

(65) Prior Publication Data

US 2020/0007701 A1 Jan. 2, 2020

(30) Foreign Application Priority Data

Jun. 29, 2018 (JP) .................................. 2018-125028

(51) Int. Cl.
*H04N 1/00* (2006.01)
*G06F 3/12* (2006.01)

(52) U.S. Cl.
CPC ....... *H04N 1/00477* (2013.01); *G06F 3/1204* (2013.01); *G06F 3/1231* (2013.01); *H04N 1/00464* (2013.01); *G06F 3/1287* (2013.01); *G06F 3/1288* (2013.01)

(58) Field of Classification Search
CPC .... G06F 3/1231; G06F 3/1204; G06F 3/1287; G06F 3/1288; H04N 1/00464; H04N 1/00477
USPC ........................................................ 358/1.13
See application file for complete search history.

(56) References Cited

U.S. PATENT DOCUMENTS

2016/0026415 A1* 1/2016 Kitada .................. G06F 3/1254
358/1.15

FOREIGN PATENT DOCUMENTS

JP 2017-54228 3/2017

\* cited by examiner

*Primary Examiner* — Saeid Ebrahimi Dehkordy
(74) *Attorney, Agent, or Firm* — Venable LLP

(57) ABSTRACT

An object is to improve convenience in a system. The present invention is a system having an image processing apparatus, a service provider server that provides a WEB service using status information on the image processing apparatus, and a management server capable of communicating with the image processing apparatus and the service provider server, and the service provider server has a transmission unit configured to transmit a registration request of information indicating that the image processing apparatus receives the WEB service to the management server and the management server has a control unit configured to manage the image processing apparatus as a status management target and to instruct the service provider server to start a WEB service for the image processing apparatus based on a user operation for the image processing apparatus to agree to transmit status information on the image processing apparatus to the management server.

20 Claims, 10 Drawing Sheets

104: SERVICE PROVIDER SERVER 103: SERVICE PROVIDER SERVER

101: IMAGE PROCESSING APPARATUS 102: MANAGEMENT SERVER

DEVICE MANAGEMENT TABLE

| Apparatus identification information | Device management situation |
|---|---|
| deviceId_0001 | management target |
| deviceId_0002 | not management target |
| deviceId_0003 | management target |

FIG.4A

SERVICE MANAGEMENT TABLE

| Apparatus identification information | Service provider identification information | Service management situation | Transmission destination information(URL) |
|---|---|---|---|
| deviceId_0001 | serviceProviderId_001 | started | |
| deviceId_0002 | serviceProviderId_002 | wait for completion of registration | |

FIG.4B

STATUS MANAGEMENT TABLE

| Apparatus identification information | Status information | Date |
|---|---|---|
| deviceId_0001 | serial No. : xxxx<br>apparatus model No. : yyyy<br>consumable item model No. : zzzz<br>consumable item remaining amount : 50, 60, 40, 10 | 20171028160000 |

SYSTEM, MANAGEMENT SERVER SYSTEM AND CONTROL METHOD

BACKGROUND OF THE INVENTION

Field of the Invention

The present invention relates to a system, a management server system, and a control method.

Description of the Related Art

In recent years, it has been made possible for an image processing apparatus represented by a printer, an MFP, and a facsimile machine, to receive offers of a variety of WEB services by connecting to the Internet and communicating with a WEB server. For example, there is a consumable item automatic delivery service in which a user notifies a selling agency of remaining amount information on consumable items, such as ink and sheets of the image processing apparatus, via the WEB server and the selling agency delivers the consumable item to the user. Further, there is a point service in which a user is given a point that can be made use of for on-line shopping and the like in accordance with the number of printed sheets and the number of times of ink exchange.

In the WEB service such as this, in a case where a user makes use of the service, it is necessary to transmit status information on the image processing apparatus (for example, serial number of the apparatus, the remaining amount of consumable item) to a server (referred to as service provider server) possessed by a service provider.

As the unit configured to transmit status information, there is a management server provided by the vendor of the image processing apparatus. The management server collects the status information on the image processing apparatus connected to this management server and transmits the collected status information to the service provider server. In the system described in Japanese Patent Laid-Open No. 2017-054228, processing to register information on the image processing apparatus is performed in the management server and the service provider server.

SUMMARY OF THE INVENTION

However, the technique described in Japanese Patent Laid-Open No. 2017-054228 described previously does not take into consideration that instructions to start execution of a service are given to the service provider server by a simple operation.

The present invention is a system having an image processing apparatus, a service provider server that provides a WEB service using status information on the image processing apparatus, and a management server capable of communicating with the image processing apparatus and the service provider server, and the service provider server has a transmission unit configured to transmit a registration request of information indicating that the image processing apparatus receives the WEB service to the management server and the management server has a control unit configured to manage the image processing apparatus as a status management target and to instruct the service provider server to start a WEB service for the image processing apparatus based on a user operation for the image processing apparatus to agree to transmit status information on the image processing apparatus to the management server.

Further features of the present invention will become apparent from the following description of exemplary embodiments with reference to the attached drawings.

DESCRIPTION OF THE EMBODIMENTS

First Embodiment

<About Configuration of System>

Figure 1:
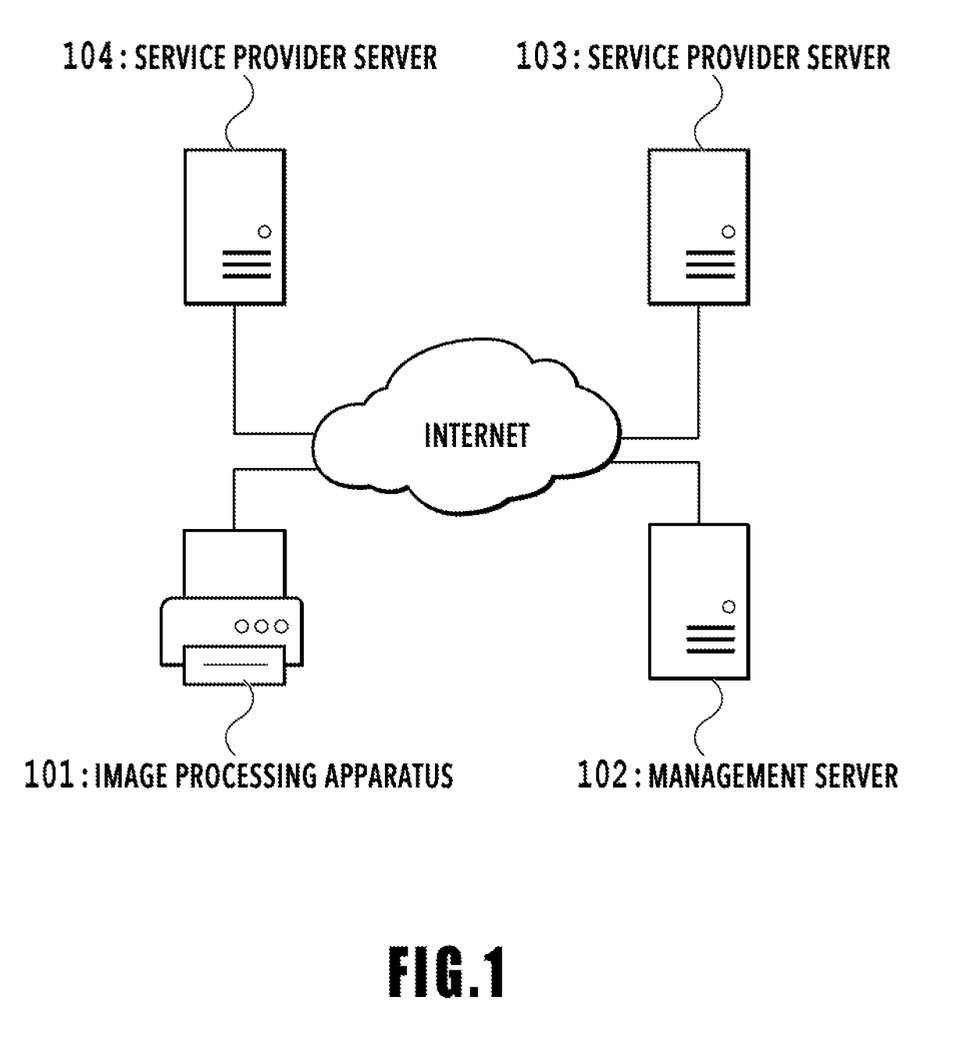
FIG. 1 is a diagram showing an outline configuration of a system in first to third embodiments.

In the following, a configuration of a system in the present embodiment is explained by using FIG. 1. FIG. 1 is a diagram showing a configuration example of a client/server network system in the present embodiment. As shown schematically, this system has an image processing apparatus 101, a management server 102, a service provider server 103, and a service provider server 104. In this system, the image processing apparatus 101 and the management server 102 are connected via the Internet. Further, the management server 102 and the service provider server 103, and the management server 102 and the service provider server 104 are connected via the Internet.

The management server 102 is the server possessed by the vendor of the image processing apparatus 101. Each of the service provider server 103 and the service provider server 104 is the server possessed by the service provider. Between the servers, communication is performed by HTTP/HTTPS. The service provider of the service provider server 103 and the service provider of the service provider server 104 may be the same or different.

In the system shown in FIG. 1, in order for a user to make use of a service provided by the service provider, it is necessary to register information on the user and information relating to the image processing apparatus of the user in the service provider server. Further, it is necessary to register information relating to the image processing apparatus and the service in the management server.

In FIG. 1, the management server is shown as on server, but the management server may be configured by a plurality of servers, such as a device management server, a service management server, and the like. Because of this, there is a case where the management server is called a management server system. Further, for convenience of explanation, the number of service provider servers is two, but the number of service provider servers may be one or three or more.

Furthermore, the number of image processing apparatuses connected with the management server may be two or more. The above is the contents of the configuration of the system in the present embodiment.

<About Hardware Configuration of Image Processing Apparatus>

Figure 2:
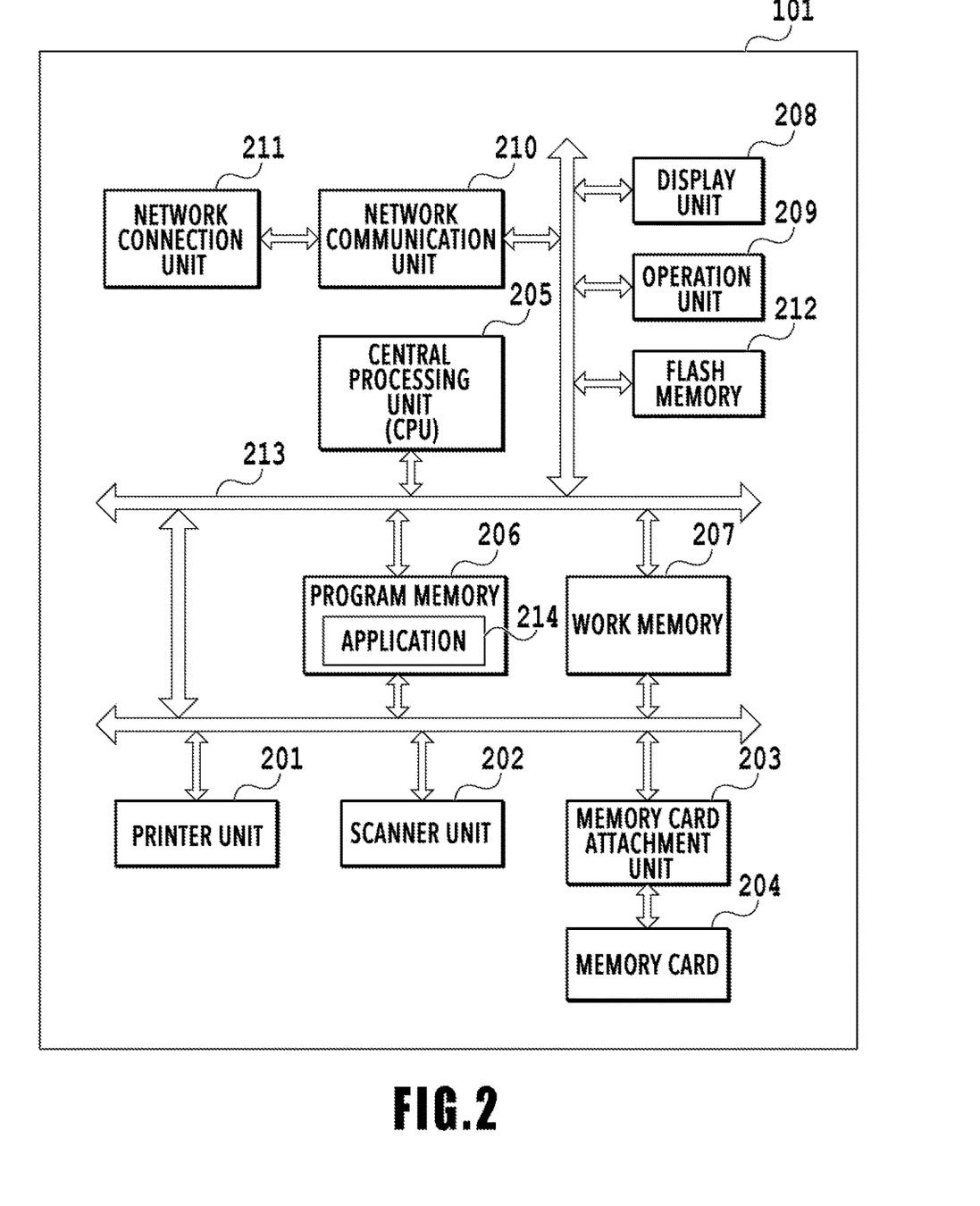
FIG. 2 is a block diagram showing a hardware configuration of an image processing apparatus in the first to third embodiments.

In the following, a hardware configuration of the image processing apparatus in the present embodiment is explained by using FIG. 2. FIG. 2 is a block diagram showing the hardware configuration of the image processing apparatus 101.

A printer unit 201 performs printing on a printing medium, such as a printing sheet, based on image data received from the outside, image data stored in a memory card 204, or the like by a printing method (specifically, ink jet method, electrophotographic method) adopted by the image processing apparatus 101. Further, the printer unit 201 also manages ink information including the ink remaining amount and sheet information including the number of sheets loaded in the image processing apparatus 101 (referred to as loaded sheets).

A scanner unit 202 generates electronic data by optically reading a document set on a document table (not shown schematically) and further transmits image data converted into a specified file format to an external device via a network, stores the image data in a saving area (not shown schematically), such as an HDD, and so on. The copy function is implemented by transferring image data obtained by the scanner unit 202 reading a document placed on the document table, or the like, to the printer unit 201 and by the printer unit 201 performing printing on a printing medium based on the transferred image data.

In the memory card 204 attached to a memory card attachment unit 203, various kinds of file data are stored. It is possible to read the file data from an external device via a network and to edit the file data. Further, it is also possible to store file data in the memory card 204 attached to the memory card attachment unit 203 from an external device.

In the image processing apparatus 101, the print function is implemented in the printer unit 201, the scanner function is implemented in the scanner unit 202, and the storage function is implemented in the memory card attachment unit 203 and the memory card 204.

Further, the image processing apparatus 101 has a CPU 205, a program memory 206, a work memory 207, a display unit 208, an operation unit 209, a network communication unit 210, a network connection unit 211, and a flash memory 212. The CPU 205 is a central processing unit configured to control each unit within the image processing apparatus 101. The program memory 206 includes a ROM and the like and stores various program codes, and an application 214 for communicating with an external device, such as a server. The module of the application 214 accesses the printer unit 201 and acquires information relating to consumable items, such as ink and sheets.

The work memory 207 includes a RAM and the like and temporarily stores image data and the like at the time of execution of each service. Further, the work memory 207 is also used for buffering and the like. The display unit 208 includes, for example, an LCD and displays and presents various kinds of information to a user. The operation unit 209 includes a button, a switch, and the like for a user to perform various input operations. The network communication unit 210 connects the image processing apparatus 101 to a network and performs various kinds of communication. It is possible to connect the image processing apparatus 101 and a network, such as the Internet, via the network connection unit 211. The network communication unit 210 is compatible with a wired LAN and a wireless LAN and the network connection unit 211 in a case where the network communication unit 210 is compatible with a wired LAN is a connector for connecting a cable of the wired LAN and the network connection unit 211 in a case where the network communication unit 210 is compatible with a wireless LAN is an antenna. The flash memory 212 is a nonvolatile memory for storing image data and the like received via the network communication unit 210. Each component described above is connected to one another via a bus 213. The above is the contents of the hardware configuration of the image processing apparatus in the present embodiment.

<About Hardware Configuration of Server>

Figure 3:
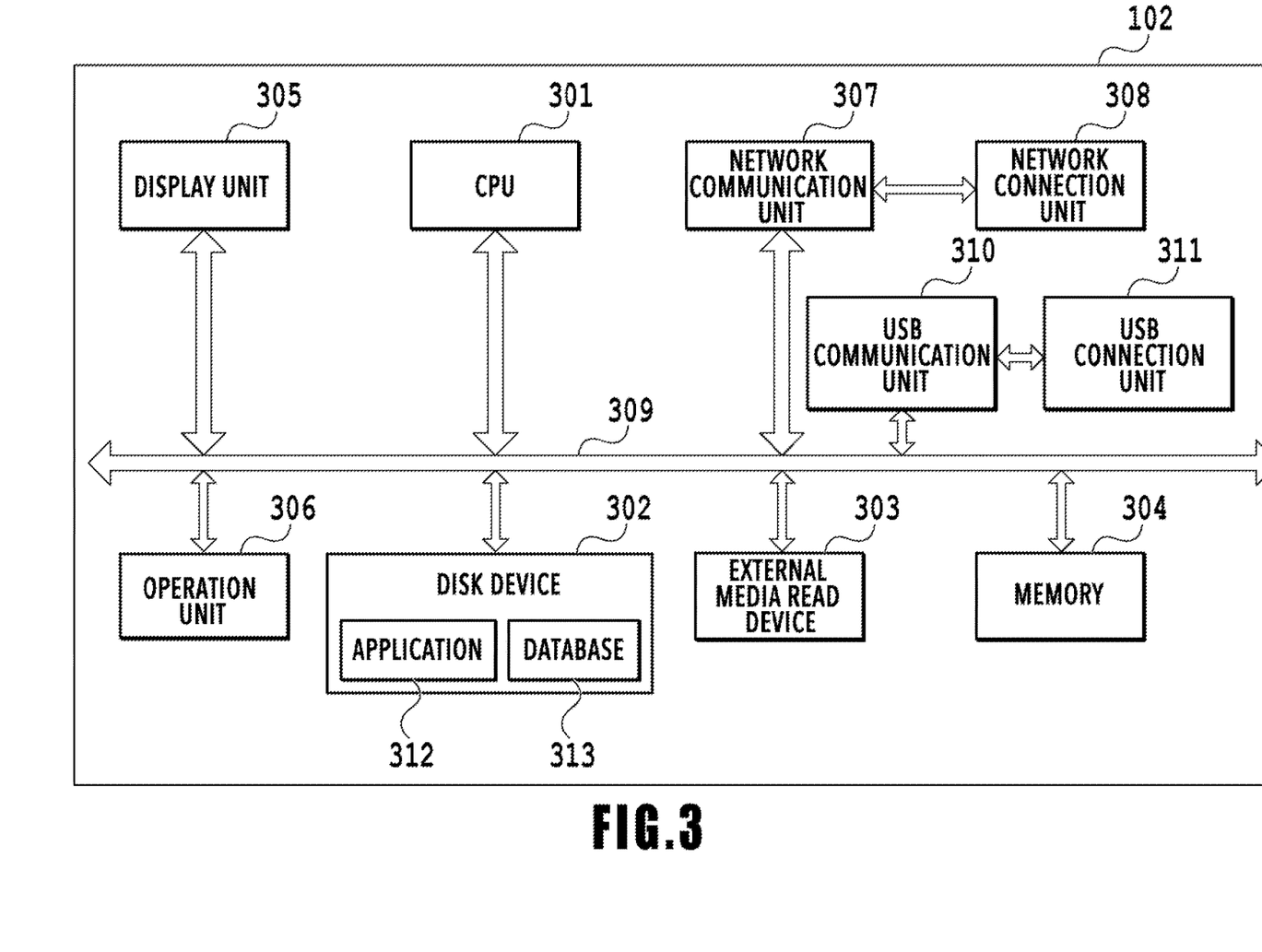
FIG. 3 is a block diagram showing a hardware configuration of a server in the first to third embodiments.

In the following, a hardware configuration of the server in the present embodiment is explained by using FIG. 3. FIG. 3 is a block diagram showing the hardware configuration of the management server 102.

A CPU 301 is a central processing unit configured to control each component of the management server 102, to be explained below. In a disk device 302, various files are stored, in addition to an application program 312 read by the CPU 301, a database 313, and an OS. An external media read device 303 is a device for reading data, such as files, stored in an external storage medium (SD card and the like) not included in the management server 102. A memory 304 includes a RAM and the like. The CPU 301 temporarily stores data in the memory 304 as needed and performs buffering and the like by using the memory 304. A display unit 305 includes, for example, an LCD and displays and presents various kinds of information to a user. An operation unit 306 includes a keyboard, a mouse, and the like for a user to perform various input operations. A network communication unit 307 is connected with a network, such as the Internet, via a network connection unit 308 and performs various kinds of communication. The network communication unit 307 is compatible with a wired LAN and a wireless LAN and the network connection unit 308 in a case where the network communication unit 307 is compatible with a wired LAN is a connector for connecting a cable of the wired LAN and the network connection unit 308 in a case where the network communication unit 307 is compatible with a wireless LAN is an antenna. A USB communication unit 310 is connected with various peripheral devices via a USB connection unit 311 and performs various kinds of communication. Then, each component described above is connected to one anther via a bus 309. It is assumed that the service provider server 103 and the service provider server 104 respectively have the same configuration as that of the management server 102. The above is the contents of the hardware configuration of the server in the present embodiment.

<About Tables Stored in Management Server>

In the following, tables that are stored in the database 313 of the management server 102 in the present embodiment are explained by using FIG. 4A to FIG. 4C.

Figure 4A:
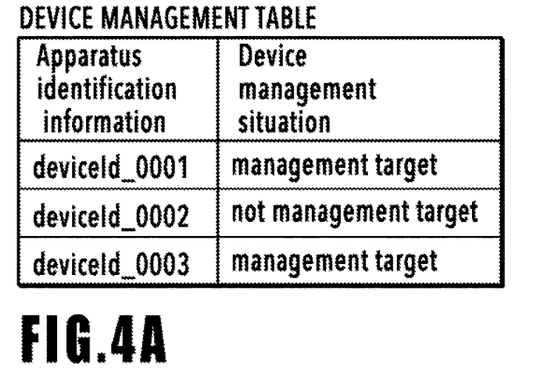
FIG. 4A to FIG. 4C are diagrams showing tables managed by a management server.

A device management table shown in FIG. 4A is a table including two columns, that is, apparatus identification information and device management situation. "Apparatus identification information" is information for identifying an image processing apparatus. "Device management situation" represents a registration situation of an image processing apparatus in the management server 102. The value of the device management situation for the image processing apparatus registered in the management server 102 as a status management target is "management target". On the other hand, the value of the device management situation for the image processing apparatus not registered in the management server 102 as a status management target is "not management target". Information that is registered in the device management table is referred to as device registration information.

Figure 4B:
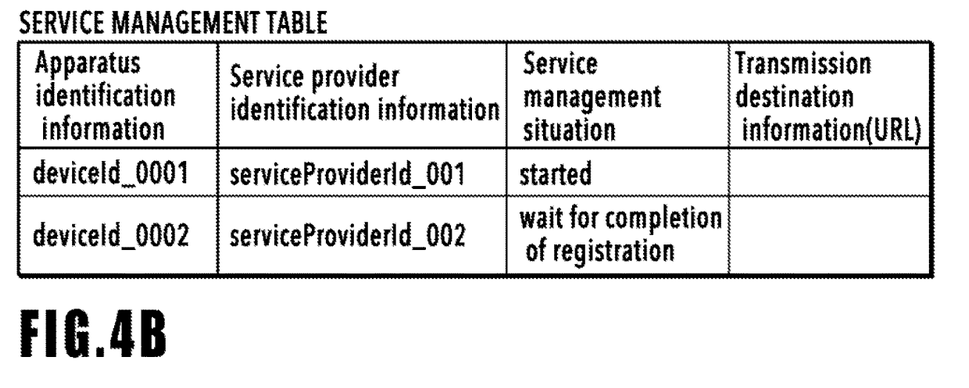

A service management table shown in FIG. 4B is a table including four columns, that is, apparatus identification information, service provider identification information, service management situation, and transmission destination information. "Apparatus identification information" is information for identifying an image processing apparatus. "Service provider identification information" is information for identifying a service provider that provides each service. "Service management situation" represents a registration situation in each service of an image processing apparatus. In a case where a registration request of a service transmitted from the service provider service is received, the management situation is registered as "wait for completion of registration" and after this, while processing to make the service effective is in progress, the management situation is registered as "processing in progress". Then, after the service is made effective, the management situation is registered as "started". "Transmission destination information" represents a transmission destination of status information and specifically, a URL of the service provider server. Information that is registered in the service management table is referred to as service registration information.

Figure 4C:
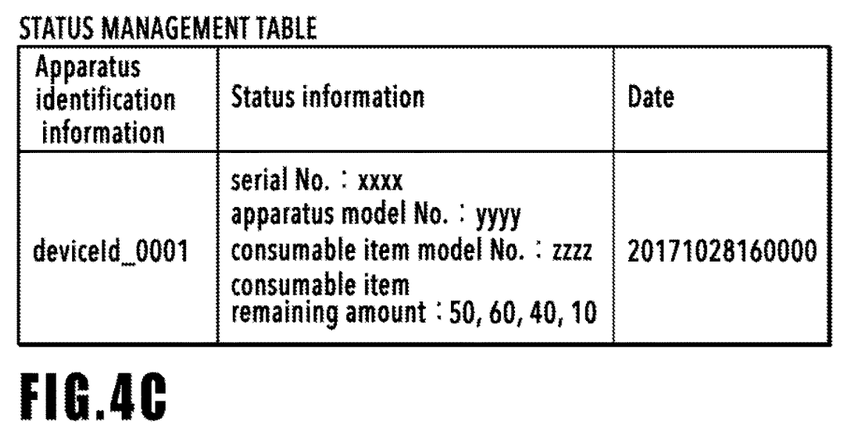

A status management table shown in FIG. 4C is a table including three columns, that is, apparatus identification information, status information, and date. "Apparatus identification information" is information for identifying the image processing apparatus having transmitted status information. "Status information" is information representing the status of the image processing apparatus. This information includes the serial No. of the image processing apparatus, the model No. of the image processing apparatus, the remaining amount of consumable item of the image processing apparatus, and the model No. of the consumable item. "Date" represents the date of reception of status information.

It is preferable to determine in advance the amount and the kind of status information saved in the status management table in accordance with the performance of the server operated in the system of the present invention and the kind of service. Further, the collected status information may be edited data. As the data such as this, for example, statistical data calculated from a plurality of pieces of status information, or the like is considered.

The table configurations shown in FIG. 4A to FIG. 4C are merely exemplary and the table that can be used in the present embodiment is not limited to those described previously. The above is the contents of the tables that are stored in the management server in the present embodiment.

<About Processing Performed by System>

Figure 5:
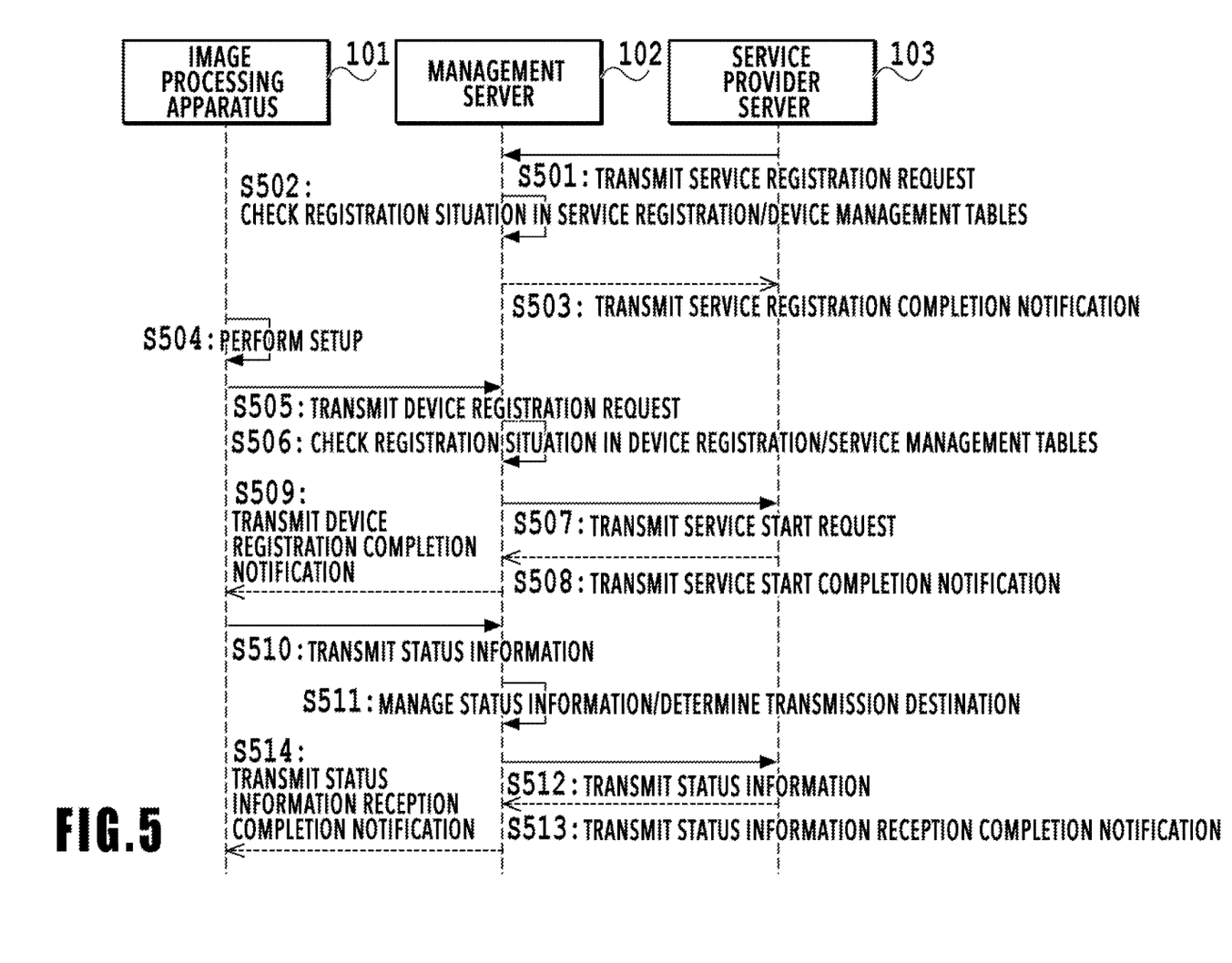
FIG. 5 is a sequence diagram showing a flow of processing performed by the system in the first embodiment.

In the following, processing performed by the system in the present embodiment is explained by using FIG. 5. This processing includes processing to register information relating to the service provided by the service provider server 103 in the management server 102 (referred to as service registration processing) and processing to register information relating to the image processing apparatus 101 to the management server 102 (referred to as device registration processing). Further, this processing also includes processing of the management server 102 to transmit status information on the image processing apparatus 101 to the service provider server 103 afterward. Here, a scene is supposed in which before a user sets up the image processing apparatus 101, specifically, the user subscribes the service in advance at the time of purchase of the image processing apparatus 101 and then the user starts the service. Further, for convenience of explanation, one image processing apparatus and one service provider server are connected to the management server, but a plurality of image processing apparatuses and a plurality of service provider servers may be connected to the management server, respectively.

At step S501, the service provider server 103 transmits a service registration request to the management server 102. At this time, the service provider server 103 transmits, along with the registration request, apparatus identification information for identifying the image processing apparatus 101, service provider identification information for identifying the service provider server 103, and transmission destination information to the management server 102. In the following, "step S-" is simply abbreviated to "S-".

At S502, the management server 102 registers the apparatus identification information, the service provider identification information, and the transmission destination information received at S501 in association with one another. Specifically, the management server 102 holds values of these items by using the service management table shown in FIG. 4B. Further, the management server 102 checks the registration situation in the device management table for the image processing apparatus identified by the apparatus identification information. Details of the procedure of the registration and check at this step will be described later by using FIG. 6.

At S503, the management server 102 transmits a service registration completion notification indicating that the registration of the service is completed to the service provider server 103 as a response to the service registration request received at S501.

At S504, the image processing apparatus 101 performs setup in accordance with a user operation. The setup includes initial setting of the image processing apparatus, setting of network connection of the image processing apparatus, setting of PC connection of the image processing apparatus, and the like. By the setup, it is made possible for the image processing apparatus 101 to communicate with the management server 102.

At S505, the image processing apparatus 101 transmits a request to prompt the management server 102 to register the device (referred to as device registration request) in the management server 102. The device registration request is transmitted along with the apparatus identification information for identifying the image processing apparatus 101 in accordance with the user operation. To explain in more detail, during the setup at S504, on the display unit 208 of the image processing apparatus 101, a screen for asking a user whether or not to agree to transmit status information on the image processing apparatus 101 to the server is displayed. By the user pressing an agreement button on the screen, S505 is performed. Because of this, it can also be said that S505 is performed by instructions to permit transmission of status information being input by a user.

At S506, the management server 102 updates the value of the service management situation for the image processing apparatus identified by the apparatus identification information to "management target" (for example, FIG. 4A) in the device management table based on the apparatus identification information received at S505. That is, the management server 102 registers the image processing apparatus 101 as a status management target by the reception at S505 and performing S506. Then, in a case where the management server 102 checks that the information on the image processing apparatus is registered in the service management table, the processing advances to S507. Details of the procedure of updating and check at this step will be described later by using FIG. 7.

At S507, the management server 102 transmits a service start request to the service provider server 103. The "service start request" is a request that the management server 102 transmits to the service provider server 103 in order to request the service provider server 103 to perform processing to start the WEB service.

At S508, the service provider server 103 transmits a service start completion notification indicating that the service start processing is completed to the management server 102 as a response to the service start request received at S507. The management server 102 having received the service start completion notification updates the value of the relevant service management situation to "started" in the service management table.

At S509, the management server 102 transmits a device registration completion notification indicating that the registration of the device is completed to the image processing apparatus 101 as a response to the device registration request received at S505.

At S510, the image processing apparatus 101 transmits status information to the management server 102. In the status information transmitted at this step, the serial No. and the MAC address of the image processing apparatus, the model No. of the image processing apparatus, the remaining amount of consumable item of the image processing apparatus, the model No. of the consumable item, and the like are included.

At S511, the management server 102 manages the status information received at S510 by registering the status information in the status management table (for example, FIG. 4C). At this step, the status information is saved in the status management table along with the apparatus identification information. Further, at this step, the management server 102 determines the transmission destination of the status information. In detail, the management server 102 acquires the value (here, URL of the service provider server 103) of the transmission destination information on the service whose value of the service management situation is set to "started" based on the apparatus identification information on the image processing apparatus 101 from the service management table.

At S512, the management server 102 transmits the status information on the image processing apparatus 101 to the service provider server 103 by using the transmission destination information acquired at S511.

At S513, the service provider server 103 transmits a status information reception completion notification indicating that the reception of the status information is completed to the management server 102.

At S514, the management server 102 transmits a status information reception completion notification indicating that the reception of the status information both in the management server 102 and in the service provider server 103 is completed to the image processing apparatus 101. The above is the contents of the processing performed by the system in the present embodiment.

That is, a user agrees to transmit the status information to the server on the screen displayed on the image processing apparatus 101. Based on the above-described agreement operation for the image processing apparatus 101, it is made possible for the management server 102 to manage the image processing apparatus 101 as a status management target and to instruct the service provider server 103 to start the WEB service. Consequently, it is no longer necessary for a user to perform the two operations for the image processing apparatus 101, such as the operation to cause the management server 102 to perform S507 and the operation to cause the management server to perform S512, and therefore, operability improves.

<About Service Registration Processing>

Figure 6:
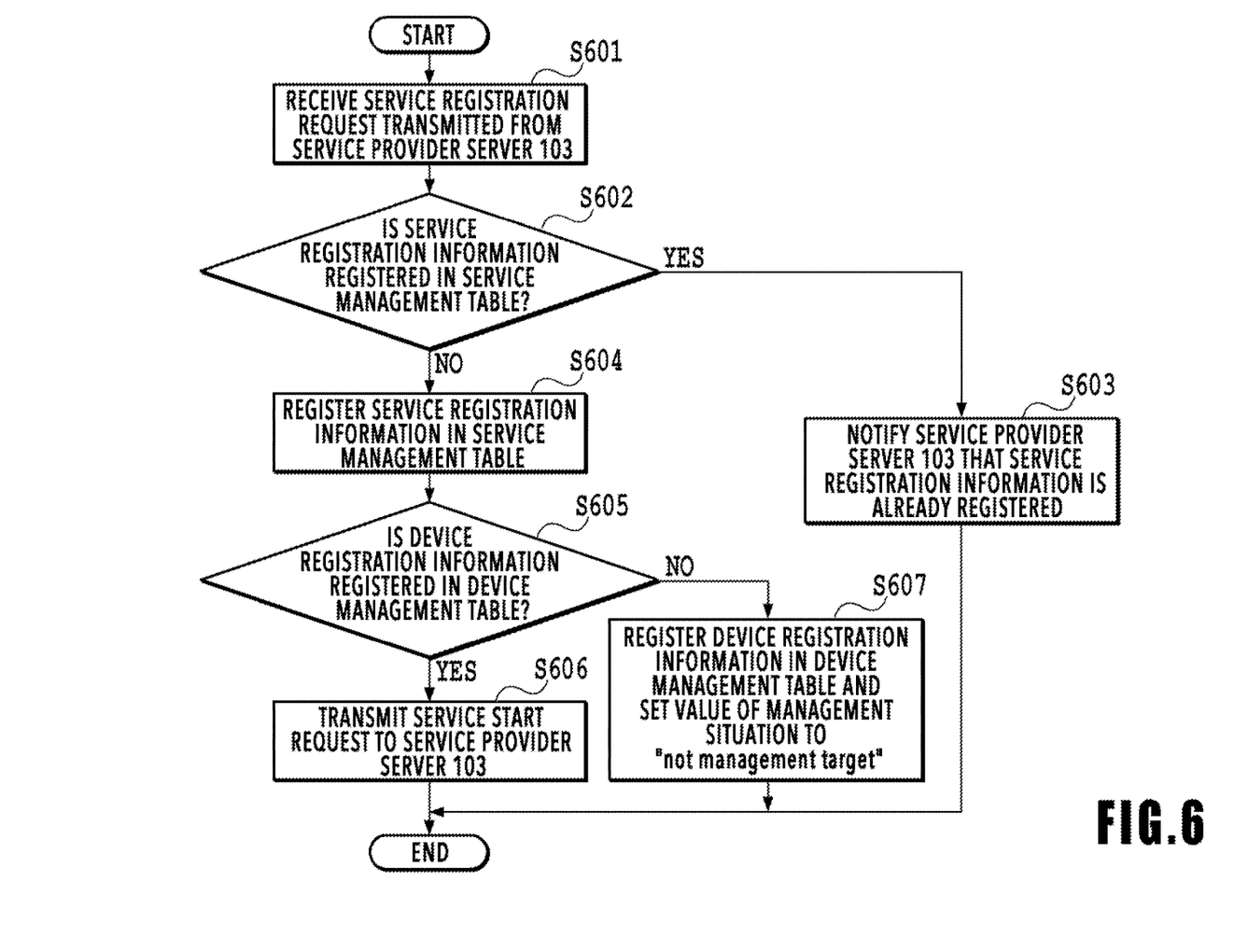
FIG. 6 is a flowchart of service registration processing in the first embodiment.

In the following, the service registration processing in the present embodiment is explained by using FIG. 6.

At S601, the management server 102 receives a service registration request transmitted from the service provider server 103. At this time, the management server 102 receives, along with the registration request, the apparatus identification information for identifying the image processing apparatus that receives the service, the service provider identification information for identifying the service provider server that provides the service, and the transmission destination information.

At S602, the management server 102 determines whether the apparatus identification information and the service provider identification information are already stored in the service management table based on the apparatus identification information and the service provider identification information received at S601. In detail, whether the apparatus identification information and the service provider identification information received at S601 are registered in the service management table in association with each other. In a case where determination results at this step are affirmative, the processing advances to S603. On the other hand, in a case where determination results at this step are negative, the processing advances to S604.

First, a case where the determination results at S602 are YES is explained. In this case, at S603, the management server 102 notifies the service provider server 103 that the image processing apparatus 101 is already registered for the service and the series of processing is terminated.

Following the above, a case where the determination results at S602 are NO is explained. In this case, at S604, the management server 102 registers the apparatus identification information, the service provider identification information, and the transmission destination information, which are received at S601, in the service management table in association with one another. At this time, the management server 102 sets the value of the service management situation corresponding to the information to "wait for completion of registration".

At S605, the management server 102 refers to the device management table based on the apparatus identification information received at S601 and determines whether the apparatus identification information is registered in the device management table (whether the value of the apparatus identification information is held in the device management table) is determined. In detail, whether the value of the apparatus identification information and the value "management target" of the device management situation are held in the device management table in association with each other. In a case where determination results at this step are affirmative, the processing advances to S606. On the other hand, in a case where determination results at this step are negative, the processing advances to S607.

At S606, the management server 102 transmits a service start request to the service provider server 103.

At S607, the management server 102 registers the apparatus identification information received at S601 in the device management table. At this time, the management server 102 sets the value of the device management situation corresponding to the apparatus identification information to "not management target". The above is the contents of the service registration processing (S502) in the present embodiment.

<About Device Registration Processing>

Figure 7:
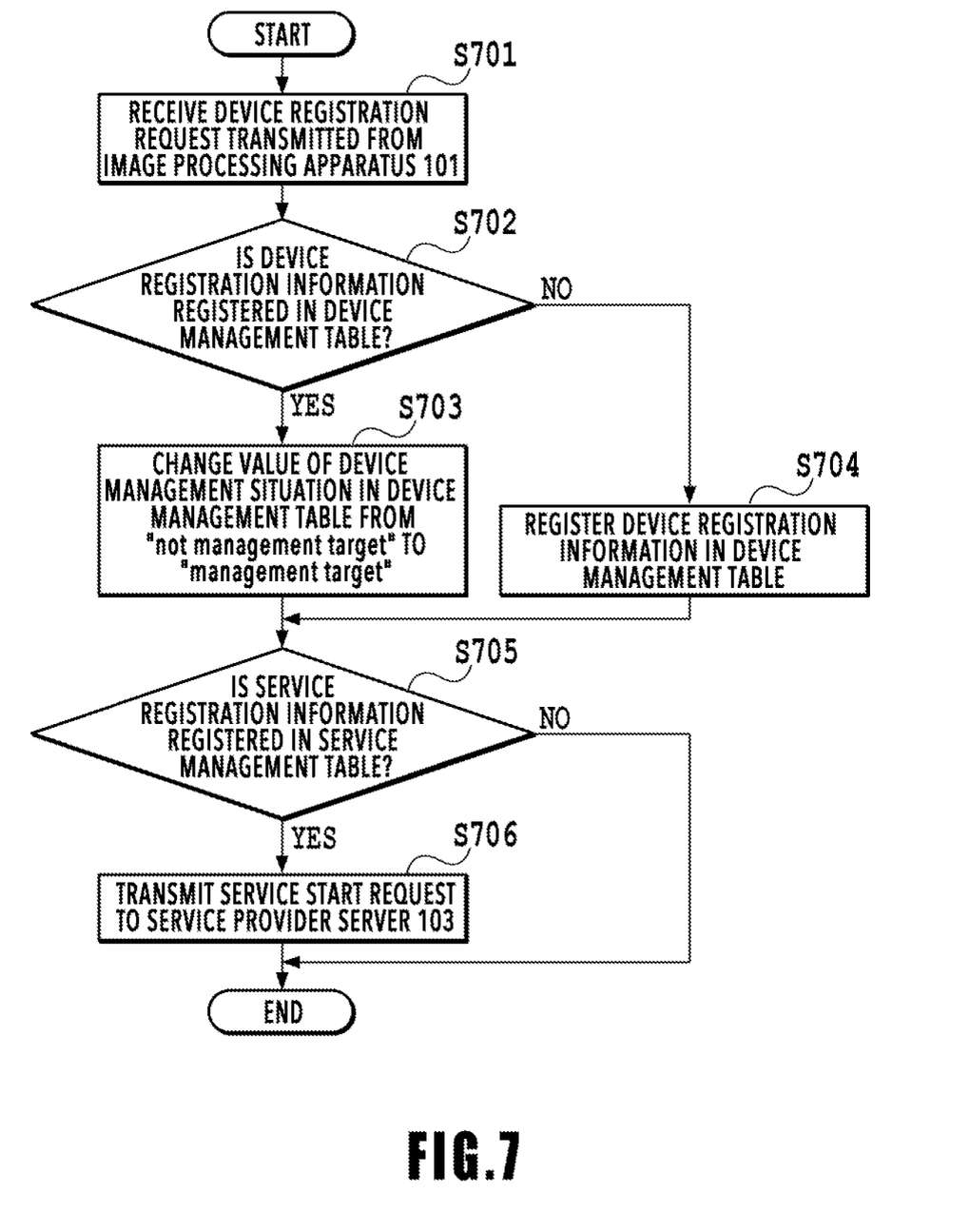
FIG. 7 is a flowchart of device registration processing in the first embodiment.

In the following, the device registration processing in the present embodiment is explained by using FIG. 7.

At S701, the management server 102 receives the device registration request transmitted from the image processing apparatus 101 along with the apparatus identification information on the image processing apparatus 101.

At S702, the management server 102 checks whether the apparatus identification information received at S701 is held in the device management table. In a case where determination results at this step are affirmative, the processing advances to S703. On the other hand, in a case where determination results at this step are negative, the processing advances to S704.

The management server 102 updates the value of the device management situation for the image processing apparatus identified by the apparatus identification information in the device management table based on the apparatus identification information received at S701, specifically, changes the value from "not management target" to "management target" (S703).

At S704, the management server 102 registers the apparatus identification information received at S701 in the device management table. At this time, the management server 102 sets the value of the device management situation corresponding to the apparatus identification information to "management target".

At S705, the management server 102 checks whether the apparatus identification information received at S701 is held in the service management table. In a case where determination results at this step are affirmative, the processing advances to S706. On the other hand, in a case where determination results at this step are negative, the series of processing is terminated.

At S706, the management server 102 transmits the service start request to the service provider server 103. The above is the contents of the service registration processing (S506) in the present embodiment.

<About Effect of the Present Embodiment>

Only by the user operation to agree to transmit the status information on the image processing apparatus 101 to the management server 102, the management server 102 enters the state where it is possible to request the service provider server 103 to start the service and also to transmit the status information. Further, after the service registration and the device registration for the management server are completed, it is made possible for the management server having received the status information to automatically start transmission of the status information to the service provider server. That is, it is made possible for the management server 102 to transmit the status information to the service provider server at appropriate timing.

Second Embodiment

The present embodiment describes that the status information transmitted to and accumulated in the management server before service registration is made use of after the service starts. In the following, differences from the already-described embodiment are explained mainly and explanation of the same contents as those of the already-described embodiment is omitted appropriately.

<About Processing Performed by System>

In the following, processing performed by the system in the present embodiment is explained by using FIG. 8. Here, it is assumed that the device registration of the image processing apparatus 101 and the service registration of the service provider server 103 for the management server 102 are completed in advance by the same procedure (FIG. 5) as that of the first embodiment. Further, it is assumed that the status information on the image processing apparatus 101 is transmitted to the service provider server 103. That is, it is possible for the management server 102 to perform the processing of the present embodiment by holding the status information also after transmitting the status information to the service provider server 103.

At S801, the service provider server 104 transmits the service registration request to the management server 102. The service provider server 104 also transmits the apparatus identification information for identifying the image processing apparatus 101, the service provider identification information for identifying the service provider server 104, and the transmission destination information on the service provider server 104 to the management server 102, in addition to the registration request.

At S802, the management server 102 registers the apparatus identification information, the service provider identification information, and the transmission destination information, which are received at S801, in association with one another. Specifically, the management server 102 holds the values of these items by using the service management table shown in FIG. 4B. Further, the management server 102 checks the registration situation in the device management table and checks that the information on the image processing apparatus 101 is already registered in the management server 102.

At S803, the management server 102 transmits a service start request to the service provider server 104.

At S804, the service provider server 104 transmits a service start completion notification indicating that the service start processing is completed to the management server 102 as a response to the service start request received at S803. The management server 102 having received the service start completion notification updates the value of the relevant service management situation to "started" in the service management table.

At S805, the management server 102 transmits a service registration completion notification indicating that the registration of the service is completed to the service provider server 104 as a response to the service registration request received at S801.

At S806, the management server 102 acquires the status information (referred to as accumulated status information) on the image processing apparatus 101 already accumulated in the status management table by referring to the status management table based on the apparatus identification information received at S801. Further, the management server 102 refers to the service management table based on the apparatus identification information and service provider identification information, which are received at S801. Due to this, the management server 102 acquires the values (that is, URLs) of the transmission destination information corresponding to the apparatus identification information and the service provider identification information, which are held in the service management table. After this, the management server 102 transmits the acquired accumulated status information to the acquired transmission destination.

At S807, the service provider server 104 transmits an accumulated status information reception completion notification indicating that the reception of the accumulated status information is completed to the management server 102.

Figure 8:
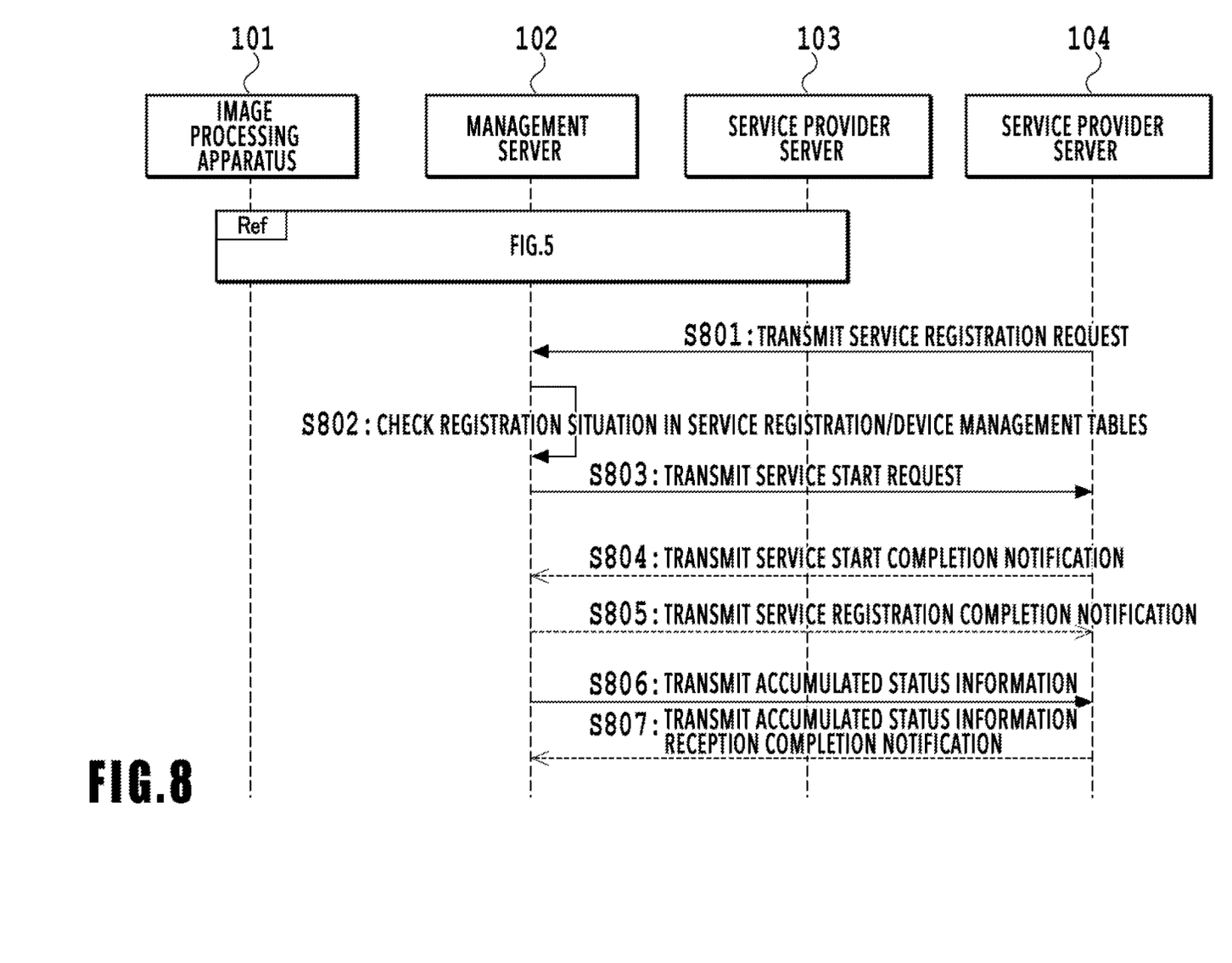
FIG. 8 is a sequence diagram showing a flow of processing performed by the system in the second embodiment.

Here, the case where registration is performed for a plurality of services is explained by using FIG. 8. However, in a case where status information is transmitted to the management server and the status information is accumulated in the management server, it is possible to transmit the accumulated status information also at the time of registration for a single service. The above is the contents of the processing performed by the system in the present embodiment.

<About Effect of the Present Embodiment>

As described above, according to the present embodiment, it is made possible to transmit the status information accumulated before service registration to the service provider server 104 immediately after completion of the service registration.

Third Embodiment

It is desirable for the processing at S505 to S509 (see FIG. 5) described previously to be performed so that the standby time of a user is reduced because the processing is based on the user operation. However, it is predicted that the processing at S507 and S508 will take time because the processing includes the communication processing between the management server and the service provider server and the processing in each server. Because of this, it is necessary to reduce the time taken for the processing by asynchronously performing the transmission processing of a service start request inside the management server, but there is such a problem that it is not possible to start a service in a case where the service start processing has failed.

Consequently, in the present embodiment, in a case where the service start at S507 and S508 has failed, an attempt is made to start a service again.

<About Processing Performed by Management Server at the Time of Reception of Status Information>

Figures 9, 9A:
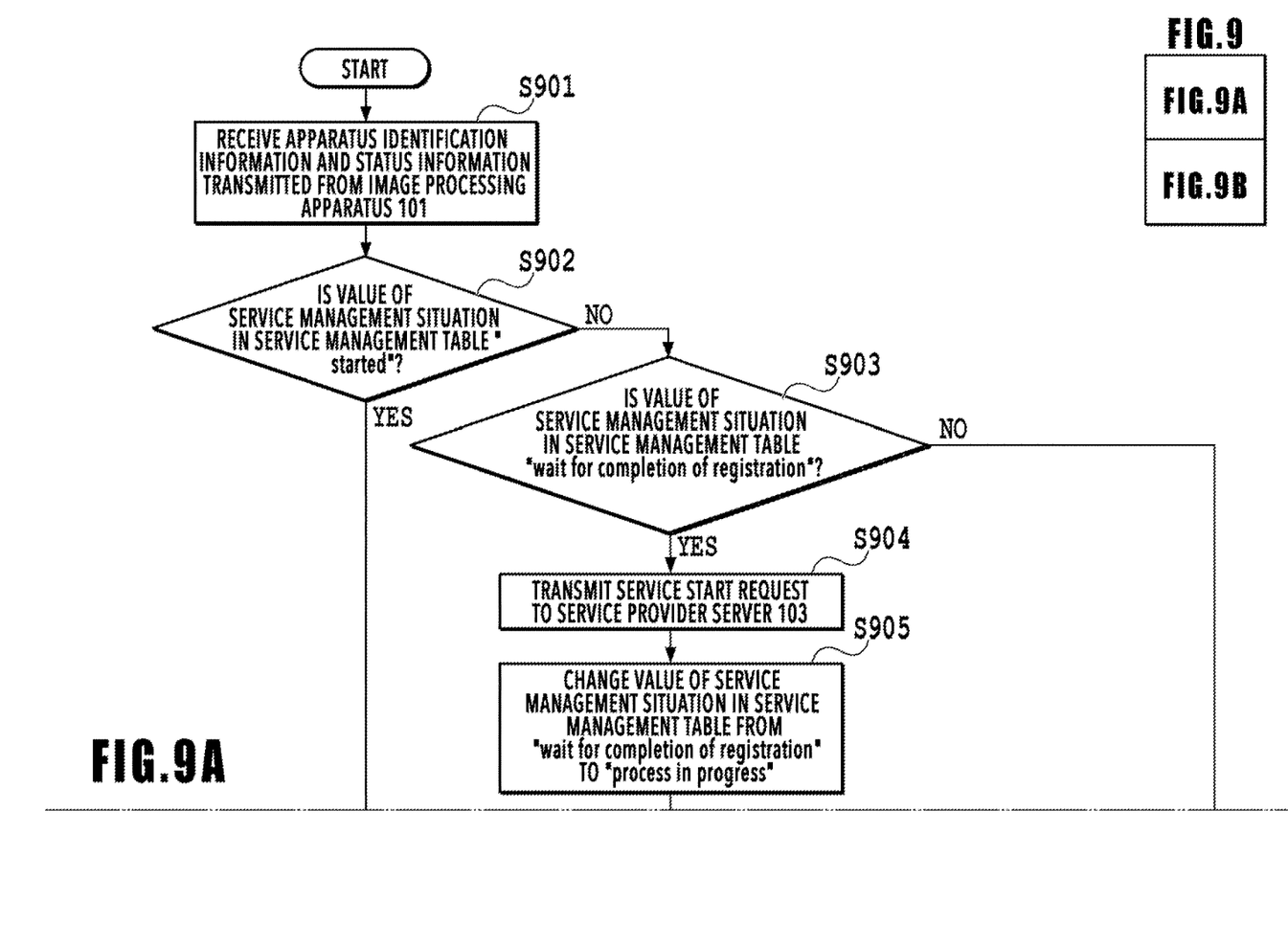
FIG. 9A and FIG. 9B are flowcharts of processing performed by a management server at the time of reception of status information in the third embodiment.
Figure 9B:
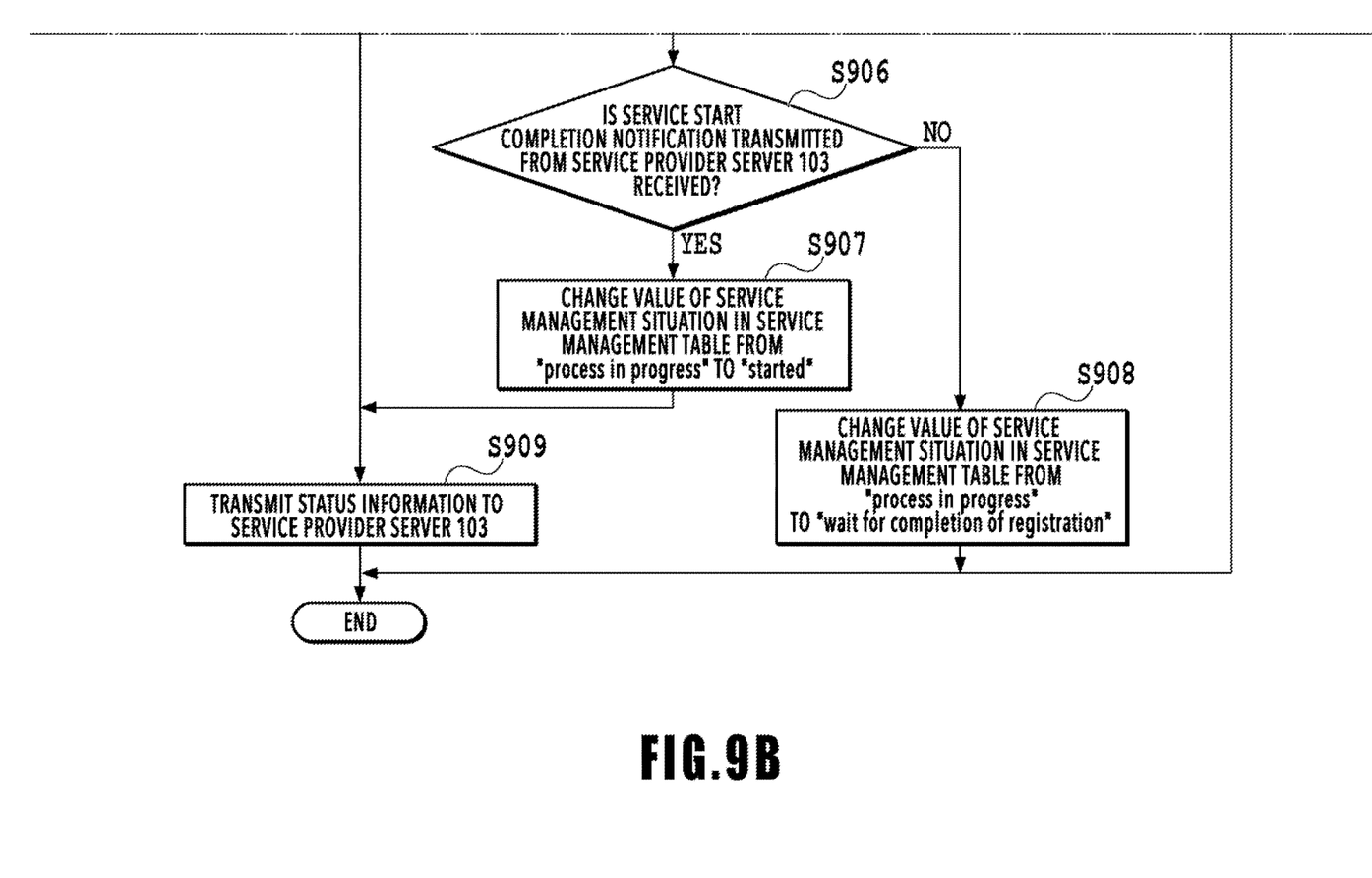

In the following, processing performed by the management server at the time of reception of status information in the present embodiment is explained by using FIG. 9A and FIG. 9B.

At S901, the management server 102 receives apparatus identification information and status information, which are transmitted from the image processing apparatus 101. Those pieces of information are transmitted to the management server 102 in a case where a predetermined event occurs in the image processing apparatus 101, or periodically. As an example of the predetermined event, mention is made of a case where print processing, copy processing, or the like is performed, a case where the power source of the image processing apparatus 101 is turned on, a case where the ink remaining amount becomes smaller than a threshold value, a case where an error occurs in the image processing apparatus, and the like.

At S902, the management server 102 determines whether the value of the service management situation corresponding to the apparatus identification information is "started" by referring to the service management table based on the apparatus identification information received at S901. In a case where determination results at this step are affirmative, the processing advances to S909. On the other hand, in a case where determination results at this step are negative, the processing advances to S903.

At S903, the management server 102 determines whether the value of the service management situation acquired at S902 is "wait for completion of registration". In a case where determination results at this step are affirmative, the processing advances to S904. On the other hand, in a case where determination results at this step are negative, the series of processing is terminated.

At S904, the management server 102 transmits a service start request along with the apparatus identification information received at S901 to the service provider server 103.

At S905, the management server 102 updates the value of the service management situation in the service management table, specifically, changes the value from "wait for completion of registration" to "processing in progress".

At S906, the management server 102 determines whether the service start completion notification transmitted from the service provider server 103 is received as a response to the service start request transmitted at S904. In a case where determination results at this step are affirmative, the processing advances to S907. On the other hand, in a case where determination results at this step are negative, the processing advances to S908.

At S907, the management server 102 updates the value of the service management situation in the service management table, specifically, changes the value from "processing in progress" to "started".

At S908, the management server 102 updates the value of the service management situation in the service management table, specifically, changes the value from "processing in progress" to "wait for completion of registration" and the series of processing is terminated.

At S909, the management server 102 transmits status information to the service provider server 103 and the series of processing is terminated. The above is the contents of the processing performed by the management server at the time of reception of status information.

<About Effect of the Present Embodiment>

As above, according to the present embodiment, in a case where the service start processing has failed, it is made possible to perform the service start processing again with reception of status information as a trigger.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible for a user to instruct a service provider server to start execution of a service by a simple operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125028 filed Jun. 29, 2018, which is hereby incorporated by reference wherein in its entirety.

What is claimed is:

1. A system having an image processing apparatus, a service provider server that provides a service using status information on the image processing apparatus, and a management server capable of communicating with the image processing apparatus and the service provider server, wherein
the service provider server has a first transmission unit configured to transmit identification information on the image processing apparatus corresponding to the service to the management server and
wherein the first transmission unit is implemented by at least one processor of the service provider server, and
the image processing apparatus has a second transmission unit configured to transmit a registration request including identification information on the image processing apparatus based on a user operation to agree to transmit status information on the image processing apparatus,
wherein after the user operation is performed, the status information is transmitted to the management server,
wherein the second transmission unit is implemented by at least one processor of the image processing apparatus, and
the management server has a determination unit configured to determine whether the identification information transmitted by the first transmission unit corresponds to the identification information transmitted by the second transmission unit, and
a third transmission unit configured to transmit the status information on the image processing apparatus to the service provider server in a case where the determination unit determines that the identification information transmitted by the first transmission unit corresponds to the identification information transmitted by the second transmission unit, and
wherein the determination unit and the third transmission unit are implemented by at least one processor of the management server.

2. The system according to claim 1, wherein the management server has:
a device management table holding information indicating whether or not the image processing apparatus is a management target;
a service management table holding information on the service; and
a status management table holding the status information.

3. The system according to claim 1, wherein
the management server:
instructs the service provider server to start the service in a case where the determination unit determines that the identification information transmitted by the first transmission unit corresponds to the identification information transmitted by the second transmission unit,
receives a service start completion notification indicating that processing to start the service is completed as a response to instructions to start the service of the service provider server, and
transmits the status information to the service provider server after receiving the service start completion notification.

4. The system according to claim 3, wherein
in a case where the management server receives the status information after the service provider server has failed processing to start the service, a service start request is transmitted again to the service provider server.

5. The system according to claim 1, wherein
the service provider server includes a first service provider server providing a first service and a second service provider server providing a second service, and
the management server:
instructs the first service provider server to start the service in a case where the determination unit determines that identification information transmitted by the first service provider server corresponds to the identification information transmitted by the second transmission unit, and
transmits the status information transmitted to the second service provider server to the first service provider server.

6. The system according to claim 1, wherein
the management server transmits, in a case of receiving the status information from the image processing apparatus in a state where it is possible for the image processing apparatus to receive the service by instructing the service provider server to start the service, the received status information to the service provider server.

7. The system according to claim 1, wherein the status information is a remaining amount of a consumable item.

8. The system according to claim 1, wherein the service provided by the service provider server is a point service in which a user is given a point that can be made use of for online shopping or a consumable item automatic delivery service.

9. A control method of a system having an image processing apparatus, a service provider server that provides a service using status information on the image processing apparatus, and a management server capable of communicating with the image processing apparatus and the service provider server, the method comprising:
transmitting, by at least one processor of the service provider server, identification information on the image processing apparatus corresponding to the service to the management server;
transmitting, by at least one processor of the image processing apparatus, a registration request including identification information on the image processing apparatus based on a user operation to agree to transmit status information on the image processing apparatus,
wherein after the user operation is performed, the status information is transmitted to the management server;
determining, by at least on processor of the management server, whether the identification information transmitted by the service provider server corresponds to the identification information transmitted by the image processing apparatus; and
transmitting, by at least one processor of the management server, the status information on the image processing apparatus to the service provider server in a case where it is determined that the identification information transmitted by the service provider server corresponds to the identification information transmitted by the image processing apparatus.

10. The control method according to claim 9, wherein the status information is a remaining amount of a consumable item.

11. The control method according to claim 9, wherein the service provided by the service provider server is a point service in which a user is given a point that can be made use of for online shopping or a consumable item automatic delivery service.

12. A management server capable of communicating with an image processing apparatus and a service provider server that provides a service using status information on the image processing apparatus, wherein the management server has:
    a first reception unit configured to receive identification information on the image processing apparatus from the service provider server;
    a second reception unit configured to receive identification information transmitted by the image processing apparatus based on a user operation to agree to transmit status information on the image processing apparatus,
    wherein after the user operation is performed, the status information is transmitted to the management server;
    a determination unit configured to determine whether the identification information received by the first reception unit corresponds to the identification information received by the second reception unit; and
    a transmission unit configured to transmit the status information on the image processing apparatus to the service provider server in a case where the determination unit determines that the identification information received by the first reception unit corresponds to the identification information received by the second reception unit,
    wherein the first reception unit, the second reception unit, the determination unit, and the transmission unit are implemented by at least one processor of the management server.

13. The management server according to claim 12, wherein
    the service provider server includes a first service provider server providing a first service and a second service provider server providing a second service and the management server:
    instructs the first service provider server to start the service in a case where the determination unit determines that identification information transmitted by the first service provider server corresponds to identification information transmitted by the second service provider server, and
    the status information transmitted to the second service provider server to the first service provider.

14. The management server according to claim 12, wherein the management server:
    instructs the service provider server to start the service in a case where the determination unit determines that the identification information received by the first reception unit corresponds to the identification information received by the second reception unit;
    receives a service completion notification indicating that the processing to start the service is completed as a response to instructions to start the service of the service provider server; and
    transmits the status information to the service provider server after receiving the service start completion notification.

15. The management server according to claim 12, wherein the status information is a remaining amount of a consumable item.

16. The management server according to claim 12, wherein the service provided by the service provider server is a point service in which a user is given a point that can be made use of for online shopping or a consumable item automatic delivery service.

17. A control method performed by at least one processor in a management server capable of communicating with an image processing apparatus and a service provider server that provides a service using status information on the image processing apparatus, the method comprising:
    receiving identification information on the image processing apparatus from the service provider server;
    receiving identification information transmitted by the image processing apparatus based on a user operation to agree to transmit status information on the image processing apparatus,
    wherein after the user operation is performed, the status information is transmitted to the management server;
    determining whether the identification information received from the service provider server corresponds to the identification information received from the image processing apparatus; and
    transmitting the status information on the image processing apparatus to the service provider server in a case where it is determined that the identification information transmitted by the service provider server corresponds to the identification information transmitted by the image processing apparatus.

18. The control method according to claim 17, wherein the service provider server includes a first service provider server providing a first service and a second service provider server providing a second service, and the method further has a transmission step of transmitting, in a case where a registration request of information indicating that the image processing apparatus receives the second service is received, the status information already accumulated before reception of the registration request of information indicating that the image processing apparatus receives the second service to the second service provider server.

19. The control method according to claim 17, wherein the management server:
    instructs the service provider server to start the service in a case where it is determined that the identification information received from the service provider server corresponds to the identification information received from the image processing apparatus;
    receives a service completion notification indicating that the processing to start the service is completed as a response to instructions to start the service of the service provider server; and
    transmits the status information to the service provider server after receiving the service start completion notification.

20. The control method according to claim 17, wherein the status information is a remaining amount of a consumable item.

* * * * *